United States Patent [19]
Keller

[11] 4,089,657
[45] May 16, 1978

[54] STABILIZED SUSPENSION OF CARBON IN HYDROCARBON FUEL AND METHOD OF PREPARATION

[75] Inventor: Leonard James Keller, Dallas, Tex.

[73] Assignee: The Keller Corporation, Dallas, Tex.

[21] Appl. No.: 797,414

[22] Filed: May 16, 1977

[51] Int. Cl.$^2$ ............................................. C10L 1/32
[52] U.S. Cl. ..................................... 44/51; 252/309; 252/363.5
[58] Field of Search .................... 44/51; 252/308, 309, 252/363.5

[56] References Cited

U.S. PATENT DOCUMENTS

| | | | |
|---|---|---|---|
| 1,390,230 | 9/1921 | Bates | 44/51 |
| 2,359,325 | 10/1944 | McConnell et al. | 44/51 |
| 2,412,680 | 12/1946 | Fisher et al. | 44/51 |
| 2,430,085 | 11/1947 | Spencer et al. | 44/51 |
| 2,590,733 | 3/1952 | Stillman | 44/51 |
| 3,732,084 | 5/1973 | Nixon et al. | 44/51 |

*Primary Examiner*—Daniel E. Wyman
*Assistant Examiner*—Mrs. Y. Harris-Smith
*Attorney, Agent, or Firm*—Wofford, Felsman, Fails & Zobal

[57] ABSTRACT

A method of preparing a stabilized suspension of carbon in hydrocarbon fuel characterized by comminuting coal to form predetermined sized particles and coating the particles with at least a coating of an alcohol having 1-4 carbon atoms and thereafter admixing the alcohol coated particles with a liquid hydrocarbon to form the substantially uniform admixture for serving as a fuel. In a preferred embodiment, coal particles are first compacted and comminuted to the predetermined size range to form an abundance of platey, lenticular, irregular and angular particles for forming a stabilized suspensoid that exhibits the property of shear thinning so as to be pumpable with a lower apparent viscosity than the at rest viscosity of the slurry of carbon in hydrocarbon. Also disclosed are specific details of the method and preferred embodiments, including the fuel composition, per se.

13 Claims, No Drawings

STABILIZED SUSPENSION OF CARBON IN HYDROCARBON FUEL AND METHOD OF PREPARATION

BACKGROUND OF THE INVENTION

1. Field of the Invention

This invention relates to a fuel and method of preparing the economical fuel composition. More particularly, this invention relates to a method of preparing a totally combustible admixture of coal in hydrocarbon to extend the life of petroliferous deposits, and the fuel, per se.

2. Description of the Prior Art

In my earlier file and co-pending application Ser. No. 615,697, now U.S. Pat. No. 4,045,092 entitled "Fuel Composition and Method of Manufacture", filed Sept. 22, 1975, there was delineated the need for obtaining economical power, yet balancing the ecological considerations so as to achieve an over all improvement for our environment, reduce pollution and the like. Also in my co-pending application Ser. No. 688,467 now U.S. Pat. No. 4,030,893 entitled "Method of Preparing Low-Sulfur, Low-Ash Fuel", filed May 20, 1976, there was further delineated the problems of the so-called "energy shortage"; evidenced by curtailment of deliveries and then only at higher prices, of natural gas, gasoline and other petroleum products. The descriptive matter of application Ser. Nos. 615,697 now U.S. Pat. No. 4,045,092 and 688,467now U.S. Pat. No. 4,030,893 are incorporated herein by reference for details that are omitted herefrom.

An excellent discussion of the conventional sources of power and their shortcomings is contained in an article "Hydrogen: It's Future in the Nation's Energy Economy" W. E. Winsche, K. C. Hoffman, and F. J. Salzano, SCIENCE, June 29, 1973, Volume 180, Number 4093. Therein, the authors delineate the projected needs for large scale economical sources of energy such as that derived from nuclear fission, solar or geothermal sources. In that article, the authors point out the disadvantages of several conventional sources of power and extol the virtues of hydrogen as a potential future source, since it is non polluting.

In my hereinbefore referenced application Ser. No. 615,697, now U.S. Pat. No. 4,045,092 the advantages of employing methanol, instead of hydrogen, to extend the world's energy sources is delineated and claimed, particularly when employed in conjunction with a widely available substitite for petroliferous fuels; namely, coal. This bodes to be an excellent source for the future, once enough methanol is synthesized to be readily available. In the near term, however, it is desirable to employ the coal to extend the useful life of the petroliferous reservoirs. In my hereinbefore referenced application Ser. No. 688,467, now U.S. Pat. No. 4,030,893 there was delineated a method of producing a coal that had low sulfur content and low ash-producing materials so as to reduce pollution.

As noted in these hereinbefore referenced application Ser. Nos. 615,697 now U.S. Pat. No. 4,045,092 and 688,467, now Pat. No. 4,030,893 there has been tried a large variety of attempts to solve the transportation problem. Of course, the conventional technology of transporting the coal by freight, such as rail car and the like, is known. Attempts have been made to transport it by hydraulic transport, employing coal-water slurry. This has not been satisfactory because of the difficulties of pumping without settling, the difficulties in sustaining combustion with the water present and the large amount of heat that must be supplied to vaporize the water with its high heat capacity and high enthalpy requirements. In my hereinbefore referenced application Ser. No. 615,697, the use of shear thinning slurries of specifically sized and shaped particles of coal in alcohol containing 1-4 carbon atoms, inclusive, or mixtures thereof, has been delineated. There has also been delineated in a couple of patents the use of coal in hydrocarbons, such as the normally gaseous hydrocarbons that are liquified under pressure. One of the difficulties of employing the slurries of coal in hydrocarbon has been the tendency of the particulate coal to fall out of the slurry and pile up in pipe elbows, storage tanks, and the like. This has resulted in plugging of pipelines, difficulty stirable bottom sediments in storage tanks or other quiesent areas, and the like.

Thus, though this art has become crowded, it can be seen that the prior art has not been totally satisfactory in providing an interim solution for extending the life of petroliferous reservoirs by using coal in making a totally combustible slurry that did not suffer from the difficulties of the prior art and have particles of coal settle out, with the resulting problems.

Specifically the prior art has not provided admixtures that had the following features.

1. It is desirable that the admixture of coal with the hydrocarbon provide a stable suspension that can be pumped without the coal particles settling out during the hydraulic transportation.

2. It is desirable that the admixture of coal in hydrocarbon form a stable suspension in which the coal particles are maintained in a substantially uniform dispersion with only mild turbulence so as to be readily put into a uniform state by mild mixing in storage or maintained in a substantially uniform admixture by flow through a pipeline.

3. It is particularly desirable in specific embodiments that the admixture of coal in hydrocarbon form a shear thinning suspensoid that can be pumped through pipelines with a lower apparent viscosity than its at rest viscosity so as to allow transportation with lowered horse-power requirements.

SUMMARY OF THE INVENTION

Accordingly, it is an object of this invention to provide a fuel composition that has one or more of the foregoing features not heretofore provided by the prior art.

It is another object of this invention to provide a fuel composition that has a plurality of the features delineated hereinbeofore and not heretofore provided by the prior art, thereby obviating the difficulties of the prior art.

In a specific aspect, it is an object of this invention to provide a fuel composition that has all of the features delineated hereinbefore as desirable and not heretofore provided by the prior art, thereby obviating the disadvantages of the prior art.

These and other objects will become apparent from the descriptive matter hereinafter.

In accordance with this invention, there is provided a method of preparing a fuel that includes a plurality of steps. First, coal is mined and comminuted to form particles of the predetermined size range and, preferably, platey, lenticular, irregular and angular particles for forming a stabilized suspensoid. Second, the coal particles are exposed to alcohol such that at least the exposed surfaces of the particles of the coal are coated with the alcohol. The alcohol is a conventional alcohol containing 1–4 carbon atoms or mixtures thereof. Consequently, alcohol-coated carbon particles are formed. Third, the alcohol-coated carbon particles are admixed with a liquid hydrocarbon to form a substantially uniform admixture, thereby forming a fuel that is totally combustible and that can be readily transported by hydraulic transport or the like to a using destination and burned with exceptionally high efficiency.

In a specific and preferred embodiment, the coal is converted into a low-sulfur, low-ash fuel called CHC fuel. The CHC fuel has a density more nearly approaching that of the liquid hydrocarbon, so inherently forms a more nearly uniform mixture that resists settling out of the carbon particles. When the CHC fuel is also again coated with alcohol immediately before being admixed with the liquid hydrocarbon, such as oil, even better results are obtained and a shear thinning suspensoid is more readily formed.

In this invention, the fuel is not only more stable and resists the settling out of the carbonaceous particles, but also provides a fuel that can be burned even in environments that could not heretofore burn coal-hydrocarbon admixtures.

DESCRIPTION OF PREFERRED EMBODIMENTS

The method of this invention has been outlined hereinbefore. The specific steps and materials are described immediately hereinafter in order to insure a complete understanding of the invention.

The coal that is employed in this invention may be any of the commercially available coals, ranging from the relatively pure and high carbon content anthracite coal through the bituminous coals to and including the less desrirable soft coals, lignites and the like.

The mining and preparation of coal is described at some length in Kirk-Othmer ENCYCLOPEDIA OF CHEMICAL TECHNOLOGY, Second Edition, Anthony Standen, Editor, Inter-Science Publishers, New York, 1969, Vol. 5, pp. 606–676; and that descriptive matter is incorporated herein by reference. The coal is mined from a coal mine by either strip or underground methods, as appropriate to the respective deposit. These methods are conventional and are described on page 660 of the aforementioned Kirk-Othmer ENCYLCOPEDIA.

The preparation of coal is described at page 661 in the above referenced Kirk-Othmer ENCYCLOPEDIA. One advantage of this invention is that it can employ the fines of the coal that were formerly discarded because of customer objections to fine coal and the loss of coal dust in loading and unloading. The exact nature of the coals in coal deposits in various states have not been completely characterized even though the deposits are known to be extensive. If a coal has a large amount of fusinite, it will be extremely friable, and will tend to concentrate in the fine size ranges during its preparation. This is helpful in practicing this invention, since the fines can be employed directly in making the alcohol coated coal particles in admixture, or slurried, with the hydrocarbon. This reduces the amount of additional work required in pulverizing, or comminuting, the coal for forming the slurry, or admixture with the hydrocarbon. Similarly, any appreciable amounts of vitrinite will readily break into fine sizes of less than one millimeter to reduce the work of additional size reduction and comminution required to get the desired range of particle sizes. As is known, in making the fine particles, the amount of work is indicated by a Hargrove Index. Specifically, a low Hargrove Index indicates that more energy will be necessary in the pulverizing mill to create the coal powder. It is understood that many of the coals, such as the Alaskan coal, have a relatively high Hargrove Index; and, hence, require relatively low power to pulverize.

The details of preparing the fine particles are contained in my aforementioned application Ser. Nos. 615,697 now U.S. Pat. No. 4,045,092 and 688,467 now U.S. Pat. No. 4,030,893. As described, particularly in the latter, the coal particles are prepared to have the suitable size range. Specifically, they are all −8 (minus eight) mesh, U.S. standard screen size with the majority of the particles being −100 mesh (minus one hundred) size. If desired, the majority of the particles may be of −200 (minus two hundred) mesh size. As is recognized, the designation of minus means that all of the particles pass through the indicated size screen. Preferably, the coal particles have a settling velocity of less than 2 ½ centimeters per second in water, particularly if the shear thinning suspensoid of the coal and hydrocarbon is to be produced.

The coals, particularly the lower quality coals, frequently have a substantial quantity of ash forming materials and the like therein that form difficultly combustible fuel and add to the problems of burning the coal by producing large quantities of slag, ash or the like in the combustion chamber. Also, these low quality coals frequently have high percentages of sulfur or organic sulfur-containing compounds that cause pollutants when oxidized or burned. It is preferred that the coal be ridded of these undesirable consitutents by servicable processes such as described in my co-pending application Ser. No. 688,467 now U.S. Pat. No. 4,030,893 before being employed in this invention. If the coal particles are treated by the delineated process and expanded, or puffed, particles are formed, they are more readily oxidized during combustion with substantially no pollution. Moreover, these puffed particles may be burned in difficultly combustible places such as even in internal combustion engines or the like because of their enhanced activity and surface area.

Specifically, in a particularly preferred embodiment, the coal particles are in the form of low-sulfur, low-ash coal particles of a density less than conventional coal. These type coal particles are described in detail, as well as the method of their preparation in my co-pending application Ser. No. 688,467 now U.S. Pat. No. 4,030,893 and are known as CHC fuel. While the descriptive matter of Ser. No. 688,467 now U.S. Pat. No. 4,030,893 has been incorporated herein by reference, a summary of the steps of employing the CHC fuel will be reiterated to obviate the necessity of having to secure copies of the patent resulting from Ser. No. 688,467 now U.S. Pat. No. 4,030,893. Specifically, the coal particles are worked in the presence of the alcohol as described hereinafter. The economical impure alcohol mixture is sometimes referred to herein as methyl fuel as a shorthand designation. As will become apparent hereinafter, the alcohol, or the methyl fuel, includes methanol as a practical matter. The working of the coal particles in the presence of the methyl fuel dissolves the water and other alcohol soluble impurities from the coal and activates and wets the surfaces of the coal particles. This step is apparently necessary to form a shear thinning slurry that is advantageous, described and claimed in my co-pending application Ser. No. 615,697, now U.S. Pat. No. 4,045,092 referenced hereinbefore. The reason is not clearly understood, just as the reason for the efficacy of the alcohol coating in this invention is not completely understood.

The coal is cleansed by any suitable method, although the cleaning is less a problem in this invention in that it also can use the fines to obtain the beneficial thixotropic properties associated with Brownian movement of the fines in the final suspensoid, when a shear thinning suspensoid is employed. If desired, the clean coal may be dewatered. Ordinarily, for fuel, it is unnecessary since the coal may have an optimum moisture content in the range of about 6–8 percent for optimum combustion. One of the surprising things that was found in making the CHC fuel was that the alcohols that were employed dissolve water and other soluble impurities and enable direct reduction in the size of low grade coals, as well as effect peptization, or colloidal dispersion of substances in the coal. These chemical constituents are recoverable and are described in Ser. No. 688,467, now U.S. Pat. No. 4,030,893 but form no part of this invention.

The CHC fuel, in one embodiment at least, was formed into puffed, or expanded particles by the flashing of the alcohol from heated coal particles. These expanded particles have a lower density that approaches that of the liquid hydrocarbon into which the coal will ultimately be admixed. These light-weight coal particles are themselves advantageous in forming a more nearly stable suspensoid, or admixture of the coal in oil, or liquid hydrocarbon, regardless of whether they are again coated with alcohol. As indicated hereinbefore, improved results are effected when they are again coated with alcohol.

Herein, the term, "alcohols" is employed to denote the alcohols having 1–4 carbon atoms, inclusive. As is recognized these alcohols include methanol, ethanol, propanol butanol, and mixtures thereof. As a practical matter, these alcohols will include methanol. These alcohols may range in purity from the substantially pure state to the crude alcohol mixtures that are produced by the gasification of coal followed by a "methanol", or alcohol, synthesis operation. These latter types of alcohols are frequently referred to in the art as "methyl fuel". The methyl fuel may be produced at a site closely adjacent the mined coal or it may be transported into the area in which are prepared the alcohol-coated coal particles. As will become apparent from the descriptive matter hereinafter, this may be the same or at a different site from the one at which the admixture of coal in the liquid hydrocarbon is formed. In my hereinbefore referenced co-pending application Ser. No. 615,697, now U.S. Pat. No. 4,045,092 I have described the gasification of coal and the subsequent alcohol synthesis from the synthesis gas produced thereby. That descriptive matter is embodied herein by reference and need not be duplicated herein.

The alcohol is then used to coat at least the surface areas of the small particles of coal before they are admixed with the liquid hydrocarbon.

They liquid hydrocarbon is a hydrocarbon that is a liquid at atmospheric temperature and pressure, rather than the normally gaseous hydrocarbons that have been described in issued patents. These liquid hydrocarbons will run the range from the substantially colorless liquids such as the naphthas to the viscous oils. Gasoline is not a preferred liquid hydrocarbon because of its high vapor pressure and the danger of an explosion, although it could be employed. The liquid hydrocarbons include kerosene, gas oils, light oils, and oil, including crude oil—even the more viscous crude oils—and the like. As a matter of commerical practicality, the crude oils will be the liquid hydrocarbons that are employed in the field, since they can be readily taken from a well head for admixture with the coal. It is preferred that the liquid hydrocarbons be treated to eliminate at the site of their production the more noxious pullutants or pullution-causing materials. These crude treating operations may be effected by passing the crude oil through caustic wash, passing through heater treaters or even running over adsorbent beds or the like. The reason why these crude treating operations are carried out in the field locations is that these locations are ordinarily in a less populated area and are frequently not regulated so closely as in the more populated and industrialized sectors. Of course, the regulations of the various governmental agencies are to be observed in these treating operations. Similarly, the treating operations will have to be tailored such that the combustibles can be treated or burned in the using location and obey the regulations or regulatory agencies at that point.

In employing the admixture of the liquid hydrocarbon and the coal particles in accordance with this invention, it is preferred that the liquid hydrocarbon have a gravity, in degrees A.P.I. (American Petroleum Institute) at least as low as about 57 and preferably below about 50. Gasoline has a degrees A.P.I. of about 57 whereas kerosene has a degrees A.P.I. of about 42. Distillant may have a degrees A.P.I. of about 35. An average light crude oil may have a degrees A.P.I. of about 48 where an average crude oil might have a degrees A.P.I. of about 40. If translated over into viscosities, the liquid hydrocarbon preferably has a viscosity above about 20 Seybolt second units (SSU) at 100° F. Typically, distillate may have about 37 SSU; and others like crude oil would have about 33 SSU; an average crude might have 40–50 SSU; and an average heavy crude may have about 60 SSU, all measured at 100° F. Even more viscous crudes may be employed. In fact, the more viscous is the crude oil, the more nearly uniform will be the suspensoid of the alcohol-coated coal particles in the liquid hydrocarbon.

In operation, the coal is ground and pulverized to small particle sizes by conventional means. The particle sizes are then screened by conventional processes, employing the pass through and recycling the fall off, conveyors and other means to obtain the desired size of particles, as delineated hereinbefore. As indicated hereinbefore, the coal may be preslurried and stored with the alcohol to effect a significant reduction in milling power requirements. As indicated hereinbefore, it is preferred that the coal particles have a platey structure with an abundance of platey, lenticular, irregular and angular particles for forming a shear thinning suspensoid with the liquid hydrocarbon.

There are various means available for effecting the size reduction and controlling the characteristics of the particulate coal to insure a maximum production of these elongate, platey and irregularly shaped particles, including a wide variety of particle shapes, for more nearly perfect shear thinning thixotropy of the resulting slurry. One satisfactory embodiment is illustrated and described in my co-pending application Ser. No. 615,697 now U.S. Pat. No. 4,045,092. Therein, the coal is first crushed. The resulting comminuted coal is sent to a roll compactor. The roll compactor then forms a planar board-like slab of coal that imposes great internal shear and tearing forces during compaction and consequent induced solids flow. The coal particles are essentially reformed in that all of the original parting planes, intersticial openings, individual particles and parting interfaces are destroyed and re-oriented. The re-orienting has a tendency to form schistose-like material with substantially parallel planes. The slabs of coal are then sent from the roll compactor to a shredder. In the shredder, the slabs of coal are pulverized to produce different types of particles of coal, as compared with the original coal. Specifically, the individual particles will be predominantly elongate, platey, lenticular, and irregular, as is desired to effect the shear thinning suspensoid. Typically, a shredder may comprise a hammermill or cage impactor to form the desired particles.

The pulverized coal particles are exposed to alcohol such that at least the exposed surfaces of the particles are coated with the alcohol. This step may be done in preparing the CHC fuel particles, as denoted hereinbefore. On the other hand, the pulverized coal particles may be exposed to alcohol vapors at a temperature just high enough to vaporize the liquids. Specifically, the coal particles are passed to a closed rotary cylinder having lifters therein and to which are sent the alcohol vapors, alone or in combination with an inert gas such as carbon dioxide. The coal particles are lifted and dropped through the vapors as the cylinder rotates.

In order to prevent a vacuum as the alcohol vapor is adsorbed onto the coal particles and condenses if the coal particles cooler than the condensation temperature, the inert gas is fed to the closed type rotary cylinder device. Any of the conventional inert gases, such as carbon dioxide, nitrogen, helium, neon, argon and the like, may be employed for this purpose. Of these, carbon dioxide is particularly satisfactory. Although it may tend to be adsorbed, it is readily replaced by the alcohol as a surface molecular coating. Moreover, while no experiments have been carried out to verify this, there appears to be serendipitious benefits from using carbon dioxide. The particles that have been coated with the alcohol in the presence of the carbon dioxide appear to be even more effective in forming the shear thinning suspensoids in the liquid hydrocarbon, than when exposed to the alcohol alone as by alternate processes such as delineated hereinafter.

In any event, the alcohol coated coal particles are then added to the liquid hydrocarbon in the desired concentration. The resulting admixture of the alcohol-coated particulate coal and the liquid hydrocarbon may be sent to storage or pumped continuously. If merely slurried together, the coal may comprise less than fifty percent by weight of the admixture. When it is desired to produce a shear thinning liquid-solid suspensoid of the alcohol-coated coal particles in the liquid hydrocarbon, the percentage of the solid particles may be increased into the range of 50–80 percent. Moreover, if desired, the slurry formed initially may be sent through an additional pulverizing process to obtain the desired particle size. The particles may be passed through the pulverizers in the slurry form. Typical pulverizers may comprise rotary mills, muller mills, or ball mills. A particularly preferred type mill is the cage-type impact mill with counter rotating cages, since the cage mills can be operated to provide a discharge with very nearly the optimum particle size and distribution. Of course, the predominant size is controlled by the mill rotating speed rate and the amount of dilution of the feed slurry.

The pulverizer discharge is then transported through suitable screens, troughs and the like to insure sufficient fineness of the coal particles for good combustion. Generally all of the coal particles should pass a 16 mesh screen, although minus 8 mesh coal particles can be employed. During the screening, the liquid hydrocarbon will separate from the coal particles. The liquid hydrocarbon and the coal particles can be recombined in the desired concentration for forming the shear thinning, thixotropic liquid-solid suspensoid. Preferably, the suspensoid contains 50–80 percent by weight of coal particles so as to have the desired thixotropic properties and shear thinning rheology. As indicated hereinbefore, the shear thinning rheology allows the liquid-solid suspensoid to be pumped at a much lower viscosity than its at rest viscosity.

The admixture of the alcohol-coated coal particles in the liquid hydrocarbon, whether in a slurry or in a shear thinning liquid-solid suspensoid, is transported by a suitable means to a destination. The transportation may be by any of the conventional means; such as, pipeline, ship, barge, railroad tank car, tank trucks and the like. The shear thinning liquid-solid suspensoid of the alcohol-coated coal particles in the liquid hydrocarbon is particularly amenable to being moved by hydraulic transport, such as being pumped through a pipeline. It may be pumped without any tendency for the coal particles to pile up as in the conventional, or prior art type of slurry, such as coal in water. If the pipeline is sufficiently long, the suspensoid may be run into storage tanks and have its pressure elevated by suitable booster pumps, as with conventional pumping technology. Centrifical pumps with conventional wear resistant coatings, such as silicone carbide or Stellite, on the impellers may be employed advantageously in the pumping means for pumping the suspensoid through the pipeline. Of course, positive displacement pumps such as are conventionally employed in pumping drilling fluid or cement slurry, may be employed. The pipeline may be any of the conventional pipelines such as by welding wrought iron pipe together in accordance with conventional engineering standards and criteria. Suitable surge tanks and pumping means are connected with the pipeline by appropriate valving.

A destination may comprise a using facility or a storage facility. The destination may, in fact, comprise a combinaton of these as for providing shipping facilities for loading ships, railcars or trucks for shipment to more distant locales or other parts of the world. Ordinarily, it is considered advantageous in the continental United States, or the North American continent, to employ pipeline to a destination, since the hydraulic transport is the most economical method of transportation.

At the ultimate using destination, the liquid-solid suspensoid of the alcohol-coated coal particles in the hydrocarbon may be employed as a fuel for heat; for a utility, such as a power plant; or for a process. On the other hand, it may be separated into its constituents and the liquid hydrocarbon and the coal employed separately. This invention is most advantageous when the using destination will employ the combination as a fuel for some sort of work producing engine, such as a power plant or the like. In such an environment, the coal particles, as well as their surface coating of alcohol, combust readily and serve to extend the petroliferous portion of the admixture in imparting heat.

In another embodiment of this invention, coal is first treated as delineated in the aforementioned applications Ser. No. 688,467 now U.S. Pat. No. 4,030,093 to produce the dry, powdered, low-ash, low-sulfur particulate carbon hydrocarbon fuel called CHC fuel. One advantage of this invention is that the CHC fuel need not be treated completely, such as being dried completely or completely separated from the alcohols. If the CHC fuel has been completely processed, it is preferably again exposed to at least sufficient alcohol to form the alcohol coating of the surfaces. As indicated hereinbefore, however, the last stage of separation from the alcohol may not be employed, since the alcohol coating is beneficial in the process of this invention. On the other hand, the puffed or expanded coal particles have been found to be uniquely advantageous, since they appear to be in an activated state. Moreover, they may be readily coated, as by exposing to vapors of the alcohol.

In any event, as described hereinbefore, the alcohol coated CHC particulate fuel is then mixed with the liquid hydrocarbon, such as the oil, in whatever proportion desired. The resulting mixture is subjected to at least minimal shear forces by a stirring or blending type of agitation, as implied hereinbefore. Conventional blending or stirring devices may be used.

Suspensions containing relatively low percentages; for example, below 50 percent, of the particulate CHC material in a low viscosity oil may require a small amount of gentle stirring to maintain uniformity and homogeniety. With larger concentrations of particulate CHC material, or with more viscous oils, or liquid hydrocarbons, the homogenous admixture remains and settling of the solid CHC particles does not occur to an extent sufficient to present any engineering problems. Such uniformity of dispersion, or homogeniety, has not been achieved in the prior art attempts to burn coal-in-oil mixtures. There is a limit, however, to the maximum percentage of the particulate solids in a particular oil to allow maintaining a pumpable effective viscosity. These limits are a function of the initial viscosity of the oil, particularly for the more viscous oils and for the particulate matter. The maximum percentages may be determined experimentally for each specific oil and particulate coal.

The medium viscosity oils provide the best high percentage of particulate solids type of suspensoids. For example, a medium grade #4 fuel oil can produce a low viscosity stable suspensoid type of shear thinning fluid at 60–65 percent CHC fuel. Again it is good policy to establish the optimum percentage of solid particles for each particular combination of liquid hydrocarbon and solid particles being employed.

The use of alcohol vapor, alone or in conjunction with an inert gas has been described hereinbefore for coating the particles of coal, including the CHC fuel particles, before admixture with the liquid hydrocarbon. If desired, the pressure of the vessel in which the coal particles are being coated with alcohol may be maintained by heating the coal prior to feeding it to the reactor. The coal particles should be heated to a temperature about equal to the temperature of the alcohol boiling point. Additional heat may be supplied to the reactor vessel for limiting the alcohol vapor addition required to control the pressure. The objective, of course, is to simultaneously control the pressure of the reactor during the coating of the particles and to control the amount of alcohol needed to accomplish the coating without saturating the coal particles throughout. As indicated hereinafter, economics may change such that the coal particles may desirably become saturated with the alcohol.

As indicated, at the present time, the alcohols are somewhat more expensive than the oils of the grades contemplated for use in this invention. Consequently, it is economically advantageous to employ merely a surface coating of the alcohol. This situation may be changed in the near future, since the cost of the oils is increasing rapidly and new technology promises to affect reduction in the cost of the alcohols. When the relative costs and availability of alcohols in sufficient quantities will permit, the coal particles may be saturated with the alcohol molecules and the same uniquely beneficial results obtained as delineated hereinbefore. Specifically, the alcohol saturated coal particles, whether they be native coal or the CHC fuel, will still effect the same shear thinning type of suspensoid to obviate the disadvantages of the prior art slurries.

The following examples illustrate embodiments of this invention that have been found satisfactory.

EXAMPLE I

Anthracite coal was crushed and screened to form −16 mesh Tyler standard screen with the majority of the particles passing through a 100 mesh screen. The coal particles were then subjected to alcohol coating being passed through a vessel having alcohol vapors in combination with carbon dioxide therein. Sufficient alcohol was adsorbed to coat the surfaces of the coal particles. The coal particles were then added to oil to have 70 percent by weight of the alcohol coated coal particles in the resulting admixture.

The resulting admixture appeared to be a black mass and looked like a solid. When subjected to shear, however, its viscosity became less and it was readily flowable, flowing like a liquid. When tested on suitable rheological testing apparatus, such as a rotating cylinder, the liquid-solid suspensoid was demonstrated to be truly thixotropic and exhibit the shear thinning in which the shear stress decreased with time and with increasing shear.

A plurality of other compositions employing a variety of concentrations of the alcohol-coated coal particles in liquid hydrocarbons were employed. The liquid hydrocarbons also ranged from the light gas oil, paraffin based fractions to the crude oils. The crude oils included naphthanic based oils, mixed base oils, paraffin based oils and the mixed base cracked oils. API gravity is ranged from 70° API to ° API. Solids loadings as high as 80 percent by weight of the alcohol-coated coal particles have been demonstrated to be feasible and obtain the shear thinning rheological properties. Greater than about 80 percent the admixture begins to affect a moistened mass that resists flow.

EXAMPLE II

In this example, CHC fuel particles that have been produced as described in the aforementioned patent applications Ser. No. 688,467, now U.S. Pat. No. 4,030,893 were again subjected to alcohol vapors in combination with carbon dioxide. The alcohol-coated CHC fuel particles was then admixed with a variety of the liquid hydrocarbons, such as delineated hereinbefore. It was found that the shear thinning, homogenous liquid-solid suspensoid could be formed when the solids particles were in a concentration in a range of about 50–80 percent, but with the optimum being in the range of 60–65 percent by weight. On the other hand, slurries were formed that could be rendered substantially homogenous with very little agitation in concentrations of less than 50 percent by weight of the alcohol-coated CHC fuel particles.

From the foregoing, it can be seen that this invention provides a technically feasible and an economically practical method for using coal or lignite resources to provide extenders for the petroliferous fuels in the transition period from using the petroleum and natural gas fuels (which are rapidly approaching extinction) to the use of new energy fuels or alternate energy sources.

Having thus described the invention, it will be understood that such description has been given by way of illustration and example and not by way of limitation, reference for the latter purpose being had to the appended claims.

What is claimed is:

1. A method of preparing a fuel comprising the steps of:
   a. comminuting coal to form particles of a predetermined size range;
   b. coating at least the exposed surfaces of said particles of said coal with an alcohol selected from the class consisting of methanol, ethanol, propanol, butanol and mixtures thereof to form alcohol coated carbon particles;
   c. admixing said alcohol coated coal particles with a liquid hydrocarbon to form a substantially uniform admixture thereof and form a fuel that can be readily transported by hydraulic transport and the like to a using destination and burned with exceptionally high efficiency.

2. The method of claim 1 wherein said coal is first compacted and then comminuted to said predetermined size range so as to form an abundance of platey, lenticular, irregular and angular particles for forming, in combination with the alcohol coating, a stabilized suspensoid at high solids concentration greater than 50 percent by weight solids that is shear thinning so as to be pumpable at a lower apparent viscosity than its at rest viscosity.

3. The method of claim 1 wherein said alcohol comprises methanol.

4. The method of claim 1 wherein said liquid hydrocarbon comprises oil.

5. The method of claim 1 wherein said coating of step b. is effected by passing said coal particles through a vessel in which is maintained an atmosphere of vapors of said alcohol.

6. The method of claim 5 wherein an inert gas is employed in said vessel in conjunction with said vapors of said alcohol so as to prevent the pressure therewithin from becoming less than atmospheric as said alcohol vapors are adsorbed on to said surfaces of said coal particles.

7. The method of said claim 1 wherein said particles of coal are saturated with said alcohol before being admixed with said liquid hydrocarbon.

8. A fuel composition comprising a substantially uniform admixture of a liquid phase comprising liquid hydrocarbon and coal particles of −8 mesh particle size with a majority being of −100 mesh particles size; said coal particles having at least sufficient alcohol to coat the surface thereof; said alcohol having 1–4 carbon atoms, inclusive.

9. The fuel composition of claim 8 wherein said substantially uniform admixture consists essentially of sufficient alcohol-coated coal particles of required shape to form a shear thinning suspensoid that can be pumped through a pipeline with lower apparent viscosity than its at rest viscosity.

10. The fuel composition of claim 9 wherein said coal particles are lenticular, platey, and irregular and are present in a proportion in the range of 50–80 percent by weight.

11. The fuel composition of claim 8 wherein said coal particles comprise CHC fuel particles.

12. The fuel composition of claim 8 wherein said alcohol coated coal particles comprise methanol.

13. The fuel composition of claim 8 wherein said liquid hydrocarbon comprises crude oil from a subterranean formation.

* * * * *